United States Patent
Ying et al.

(10) Patent No.: US 10,153,706 B2
(45) Date of Patent: Dec. 11, 2018

(54) PRECHARGE DEVICE APPLIED IN FLYING CAPACITOR TYPE MULTI-LEVEL CONVERTER CIRCUIT AND FREQUENCY CONVERTER HAVING THE PRECHARGE DEVICE

(71) Applicant: Delta Electronics, Inc., Taoyuan, Taiwan (CN)

(72) Inventors: Jianping Ying, Taoyuan (TW); Teng Liu, Taoyuan (TW); Yi Zhang, Taoyuan (TW); Yong Zeng, Taoyuan (TW)

(73) Assignee: Delta Electronics, Inc., Taoyuan, Taiwan (CN)

( * ) Notice: Subject to any disclaimer, the term of this patent is extended or adjusted under 35 U.S.C. 154(b) by 0 days.

(21) Appl. No.: 15/805,273

(22) Filed: Nov. 7, 2017

(65) Prior Publication Data

US 2018/0131271 A1    May 10, 2018

(30) Foreign Application Priority Data

Nov. 8, 2016   (CN) .......................... 2016 1 1021065

(51) Int. Cl.
   *H02M 5/40*    (2006.01)
   *H02M 5/458*   (2006.01)
   *H02M 1/36*    (2007.01)
   *H02M 1/42*    (2007.01)

(52) U.S. Cl.
   CPC .......... *H02M 5/4585* (2013.01); *H02M 1/36* (2013.01); *H02M 1/4216* (2013.01)

(58) Field of Classification Search
   CPC ................... H02M 5/40–5/4585; H02M 1/36
   See application file for complete search history.

(56) References Cited

U.S. PATENT DOCUMENTS

| | | | |
|---|---|---|---|
| 2015/0194902 A1* | 7/2015 | Tian ................... | H02M 5/458 363/37 |
| 2016/0204713 A1* | 7/2016 | Dwari ................. | H02M 7/217 363/89 |
| 2017/0012553 A1* | 1/2017 | De Vita .............. | H02J 50/10 |
| 2017/0030984 A1* | 2/2017 | Deng .................. | G01R 33/16 |

* cited by examiner

*Primary Examiner* — Kyle J Moody
*Assistant Examiner* — Peter Novak
(74) *Attorney, Agent, or Firm* — Yunling Ren (57) ABSTRACT

The present disclosure provides a precharge device and a frequency converter. The precharge device is applied in a flying capacitor type multi-level converter circuit, and the multi-level converter circuit includes: a flying capacitor, a bus capacitor, a first and second semiconductor components, wherein the first semiconductor component is electrically connected between a first end of the flying capacitor and a first end of the bus capacitor, and the second semiconductor component is electrically connected between a second end of the flying capacitor and a second end of the bus capacitor; and the precharge device includes: an AC source; and an auxiliary circuit electrically connected with the AC source, wherein the auxiliary circuit reuses the first and second semiconductor components, and the AC source charges the flying capacitor and the bus capacitor through the auxiliary circuit.

16 Claims, 9 Drawing Sheets

PRECHARGE DEVICE APPLIED IN FLYING CAPACITOR TYPE MULTI-LEVEL CONVERTER CIRCUIT AND FREQUENCY CONVERTER HAVING THE PRECHARGE DEVICE

CROSS REFERENCE

This application is based upon and claims priority to Chinese Patent Application No. 201611021065. X filed on Nov. 8, 2016, the entire contents thereof are incorporated herein by reference.

TECHNICAL FIELD

The present disclosure generally relates to field of electronic power technology, and more particularly, to a precharge device and a frequency converter applying the precharge device.

BACKGROUND

With the rapid development of modem power electronic technology and microelectronic technology, high-voltage and high-power frequency converter have gradually matured. Taking a high-voltage and high-power frequency converter as an example, in addition to inclusion of a rectifier circuit, an inverter circuit, a filter circuit and other parts, a DC (Direct Current) bus needs to be equipped with a precharge device. The precharge device is used to limit current charging a capacitor at the moment of the power source being powered on, such that elements of the converter can be protected from being damaged due to an instantaneous short-circuit current of the capacitor.

The voltage of the DC bus in the high-voltage and high-power frequency converter may be as high as tens of thousands volts, so insulation of the precharge device is a difficult problem. Moreover, in a multi-level circuit including a flying capacitor, the precharge voltages required by individual capacitors are different, resulting in problems of cost, volume and complexity.

The above problem is a challenge for frequency converters which require high efficiency, high power density, high reliability and low cost.

It should be noted that, the above information disclosed in this Background section is only for helping understanding of the background of the present disclosure, therefore, it may include information that does not constitute prior art known by those skilled in the art.

SUMMARY

One objective of the present disclosure is to provide a precharge device and a frequency converter applying the precharge device, which may overcome, at least to some extent, one or more problems due to limitation and defects of the related art.

The other characteristics and advantages of the present disclosure may become apparent from the following detailed description, or partly learned from the practice of the present disclosure.

According to one aspect of the present disclosure, there is provided a precharge device applied in a flying capacitor type multi-level converter circuit, wherein the multi-level converter circuit includes:

a flying capacitor, a bus capacitor, a first semiconductor component and a second semiconductor component, herein the first semiconductor component is electrically connected between a first end of the flying capacitor and a first end of the bus capacitor, and the second semiconductor component is electrically connected between a second end of the flying capacitor and a second end of the bus capacitor; and the precharge device includes:

an AC source; and an auxiliary circuit electrically connected with the AC source, wherein the auxiliary circuit reuses the first semiconductor component and the second semiconductor component, and the AC source charges the flying capacitor and the bus capacitor through the auxiliary circuit.

According to one aspect of the present disclosure, there is provided a precharge device, applied in a flying capacitor type multi-level converter circuit, wherein the multi-level converter circuit includes:

a bus capacitor containing a first bus capacitor and a second bus capacitor connected in series, the first bus capacitor and the second bus capacitor being electrically connected to a first center point;

N flying capacitors, N being an integer greater than 1;

N first semiconductor components, wherein the nth of the first semiconductor components is electrically connected between a first end of the nth flying capacitor and a first end of the bus capacitor; and N second semiconductor components, wherein the nth of the second semiconductor components is electrically connected between a second end of the nth flying capacitor and a second end of the bus capacitor;

the precharge device includes:

an AC source electrically connected with an auxiliary circuit and charging the flying capacitor and the bus capacitor through the auxiliary circuit;

the auxiliary circuit reuses the first semiconductor component and the second semiconductor component and the auxiliary circuit further includes:

a first auxiliary capacitor;

a second auxiliary capacitor having a first end electrically connected to a second end of the first auxiliary capacitor;

a third semiconductor component electrically connected between the first center point and a first end of the first auxiliary capacitor;

a fourth semiconductor component electrically connected between the first center point and a second end of the second auxiliary capacitor;

N fifth semiconductor components, wherein the nth of the fifth semiconductor components is electrically connected between a first end of the nth flying capacitor and the first end of the first auxiliary capacitor; and N sixth semiconductor components, wherein the nth of the sixth semiconductor components is electrically connected between a second end of the nth flying capacitor and the second end of the second auxiliary capacitor.

According to one aspect of the present disclosure, there is provided a frequency converter, including a flying capacitor type multi-level converter circuit and any one of the above precharge devices.

Thus, the current charging the flying capacitor and the bus capacitor may be limited at the moment of the power source being powered on, and in turn, elements in the multi-level converter circuit may be protected from being damaged due to an instantaneous short circuit current of respective capacitors. In addition, since original devices in the multi-level converter circuit are reused, devices required by the precharge device may be reduced, which may in turn reduce the volume and cost of the precharge device.

In order to further understand the features and technical contents of the present disclosure, the following detailed description related to the present disclosure and the accompanying drawings may be referred to. However, the detailed description and accompanying drawings herein are merely illustrative of the present disclosure, but are not intended to limit the scope of the claims of the present disclosure.

BRIEF DESCRIPTION OF THE DRAWINGS

The above and other features and advantages of the present disclosure will become more apparent by description of exemplary embodiments of the present disclosure in detail with reference to the accompanying drawings.

DETAILED DESCRIPTION

Example implementations will now be described in further detail with reference to the accompanying drawings. The example implementation, however, may be embodied in various forms, and should not be construed as being limited to the implementations set forth herein. Rather, these implementations are provided so that the present disclosure will become thorough and complete, and will fully convey the concept of the inventive concept to those skilled in the art. Similar reference numerals denote the same or like structures throughout the accompanying drawings, and thus repeated description thereof will be omitted.

In addition, the described features, structures or characters may be combined in one or more embodiments in any suitable manner. In the following description, numerous specific details are provided so as to allow a full understanding of the embodiments of the present disclosure. However, those skilled in the art will recognize that the technical solutions of the present disclosure may be implemented without one or more of the specific details, or other structures, parts, steps, methods and so on may be used. In other cases, the well-known structures, parts or operations are not shown or described in detail to avoid obscuring various aspects of the present disclosure.

Figure 1:
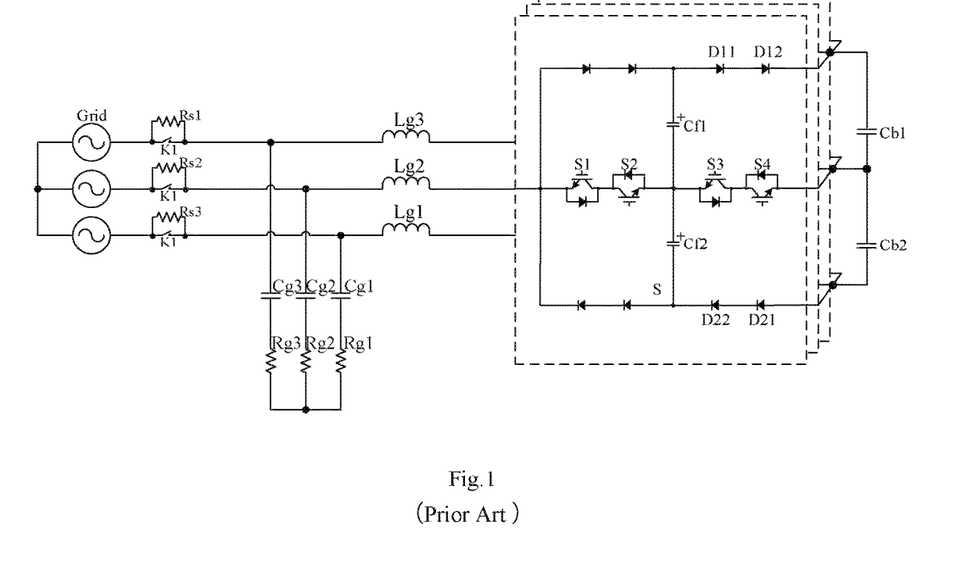
FIG. 1 is a circuit schematic diagram of a five-level rectifier circuit and a precharge device thereof.

FIG. 1 illustrates a precharge technical scheme of a five-level rectifier circuit. As shown in FIG. 1, the precharge-of flying capacitors Cf1 and Cf2 and bus capacitors Cb1 and Cb2 are completed by providing high-voltage type vacuum contactors K1 to K3 and power resistors Rs1 to Rs3 at a power grid side and cooperating with switching states of transistors in the five-level rectifier circuit. The specific operation process is: when the five-level rectifier circuit is started, by controlling transistors S1 and S2 to be turned off, transistors S3 and S4 to be turned on and the vacuum contactors K1~K3 to be cut off, the flying capacitors Cf1, Cf2 and the bus capacitors Cb1, Cb2 are precharged by the output of the power grid through current limiting resistors Rs1 to Rs3 and diodes in the circuit. When voltages of the flying capacitors Cf1, Cf2 reach a predetermined value, transistors S3 and S4 are controlled to be turned off, the precharge of the bus capacitor Cb1, Cb2 is continued. When voltages of the bus capacitors Cb1 and Cb2 also reach a predetermined value, the vacuum contactors K1 to K3 are controlled to be closed to bypass the power resistors Rs1 to Rs3, thus completing the precharge process.

Deficiencies of the technical scheme in FIG. 1 mainly lie in that volumes of the high-voltage type vacuum contactors and power resistors are large, and the cost is high, which are not conducive to miniaturization of the frequency converter. In occasions where the frequency converter needs to be started frequently, the vacuum contactor also needs to be closed and cut off frequently. The long-term operation not only reduces lifespan of the vacuum contactor, but also affects a normal operation of the frequency converter due to poor contact of the vacuum contactor. Based on this, a new precharge device is provided in the present exemplary embodiment, thereby solving some or all of the above-mentioned problems to some extent.

Figure 2:
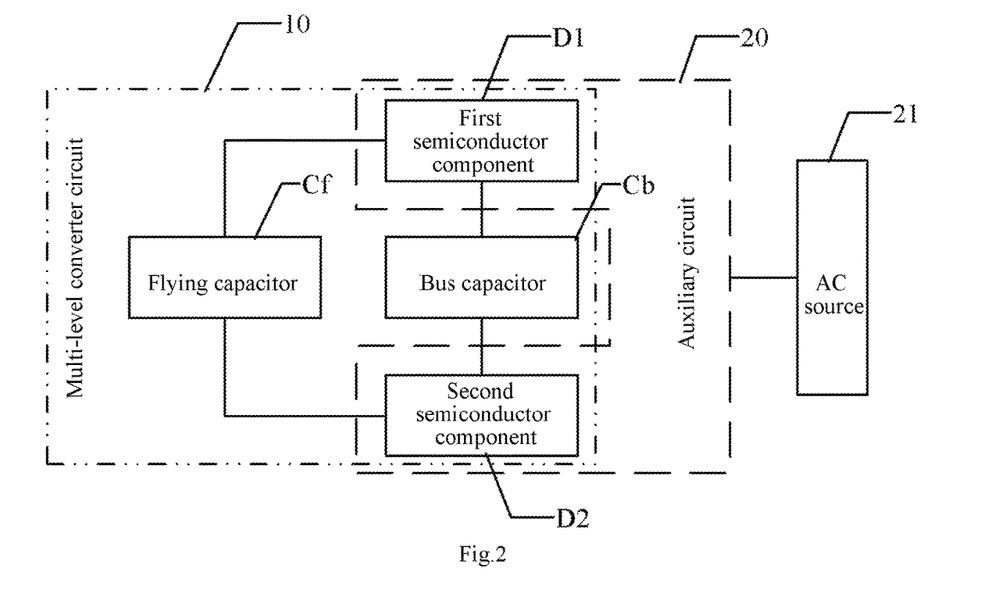
FIG. 2 is a block diagram of a multi-level rectifier circuit and a precharge device thereof in an exemplary embodiment of the present disclosure.

The precharge device provided in the present exemplary embodiment may be applied to a flying capacitor type multi-level converter circuit, Referring to FIG. 2, the multi-level converter circuit 10 at least includes: a flying capacitor Cf, a bus capacitor Cb, a first semiconductor component D1 and a second semiconductor component D2, In the embodiment, the first semiconductor component D1 is electrically connected between a first end of the flying capacitor Cf and a first end of the bus capacitor Cb. The second semiconductor component D2 is electrically connected between a second end of the flying capacitor Cf and a second end of the bus capacitor Cb. Continuing to refer to FIG. 2, the precharge, device provided by the present embodiment may include an AC source 21 and an auxiliary circuit 20. In the embodiment, the AC source 21 may serve to provide an alternating voltage. The auxiliary circuit 20 may reuse the above first semiconductor component D1 and the second semiconductor component D2. Besides, the auxiliary circuit 20 is electrically connected with the AC source 21. The AC source 21 may charge the flying capacitor Cf and the bus capacitor eh through the auxiliary circuit 20. Thus, the current charging the flying capacitor Cf and the bus capacitor Cb may be limited at the moment of power-on of the power source, and in turn, elements in the multi-level converter circuit may be protected from being damaged due to an instantaneous short-circuit current of respective capacitors. In addition, since original devices in the multi-level converter circuit are reused, devices required by the precharge device can be reduced, which can in turn reduce the volume and cost of the precharge device.

The precharging device in the present exemplary embodiment will be further described below in combination with a specific multi-level converter circuit.

Figure 3:
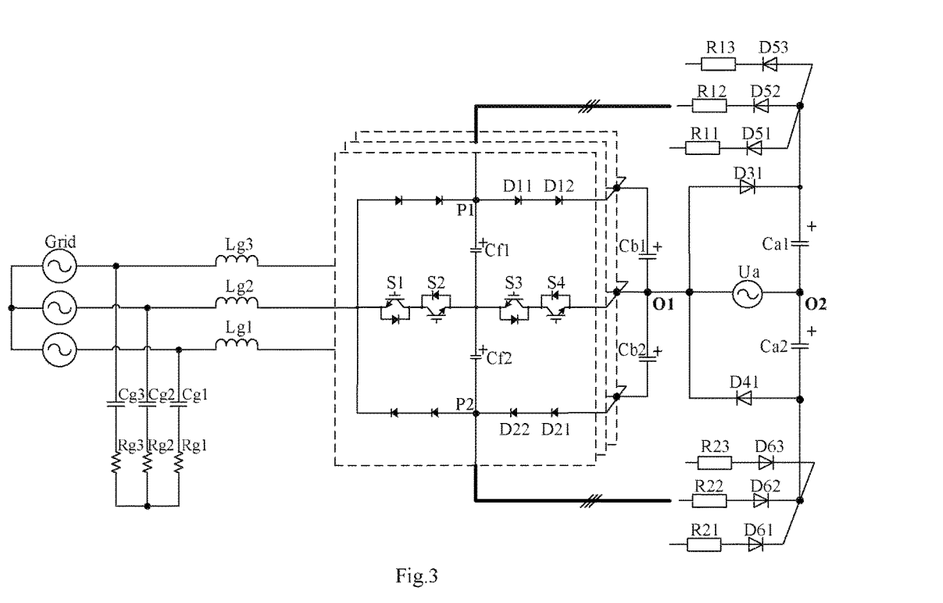
FIG. 3 is a circuit schematic diagram of a five-level rectifier circuit and a precharge device thereof in an exemplary embodiment of the present disclosure.

Referring to FIG. 3, taking a five-level rectifier circuit as an example, the bus capacitor Cb may contain a first bus capacitor Cb1 and a second bus capacitor Cb1 coupled in series, and the first bus capacitor Cb1 and the second bus capacitor Cb1 are electrically connected to a first center point O1. For example, a second end of the first bus capacitor Cb1 and a first end of the second bus capacitor Cb2 are electrically connected to the first center point O1. Similarly, the auxiliary circuit may further contain a first auxiliary capacitor Ca1 and a second auxiliary capacitor Ca2 electrically connected in series, and the first auxiliary capacitor Ca1 and the second auxiliary capacitor Ca2 are electrically connected to a second center Point O2. For example, a second end of the first auxiliary capacitor Ca1 and a first end of the second auxiliary capacitor Ca2 are electrically connected to the second center point O2 In the embodiment, an output of the AC source is electrically connected between the first center point O1 and the second center point O2, supplying an output voltage Ua to the auxiliary circuit. Furthermore, it will be readily appreciated by those skilled in the art that, technical schemes that include other numbers of capacitors are also within the protection scope of the present disclosure.

Continuing to refer to FIG. 3, in the present exemplary embodiment, the auxiliary circuit may further include a third semiconductor component D31, a fourth semiconductor component D41, a fifth semiconductor component D51 and a sixth semiconductor component D61. In the embodiment, the third semiconductor element D31 is electrically connected between the first center point O1 and a first end of the first auxiliary capacitor Ca1. The fourth semiconductor element D41 is electrically connected between the first center point O1 and a second end of the second auxiliary capacitor Ca2. The fifth semiconductor element D51 is electrically connected to a first end of a flying capacitor (the flying capacitor in FIG. 3 is constituted by the first flying capacitor Cf1 and the second flying capacitor Cf2 coupled in series)and the first end of the first auxiliary capacitor Ca1. The sixth semiconductor element D61 is electrically connected to a second end of the flying capacitor (the flying capacitor in FIG. 3 is constituted by the first flying capacitor Cf1 and the second flying capacitor Cf2 coupled in series) and the second end of the second auxiliary capacitor Ca2.

In the present exemplary embodiment, by utilizing the first auxiliary capacitor Ca1, the second auxiliary capacitor Ca2, the third semiconductor component D31, the fourth semiconductor component D41, the fifth semiconductor component D51 and the sixth semiconductor component D61 in the auxiliary circuit, and then reusing the first semiconductor components D11 and D12 and the second semiconductor components D21 and D22 in the five-level rectifier circuit, a voltage multiplying rectifier circuit is constituted. Thus, an AC power output from the above AC source may be rectified and boosted to charge the bus capacitor and the flying capacitor in the five-level rectifier circuit. In other exemplary embodiments of the present disclosure, the voltage multiplying rectifier circuit may also be constituted with other semiconductor components in the five-level rectifier circuit and a circuit including other components in the auxiliary circuit, which all belong to the protection scope of the present disclosure.

Continuing to refer to FIG. 3, in the present exemplary embodiment, the auxiliary circuit may further include a first resistor R11 and a second resistor R21. In the embodiment, the first resistor R11 is electrically connected in series with the fifth semiconductor component D51, and the fifth semiconductor component D51 is electrically connected to the first end of the flying capacitor through the first resistor R11. The second resistor R21 is connected in series with the sixth semiconductor element D61, and the sixth semiconductor component D61 is electrically connected to the second end of the flying capacitor through the second resistor R21. After the rectifier circuit is connected to the power grid and operates normally, voltages of the DC bus and the flying capacitor may fluctuate, and a potential of point P1 may be higher than that of point O1, and by setting the first resistor R11, a current of the branch where the first resistor R11 is provided may be limited. Similarly, a potential of point P2 may be higher than that of point O1, and by setting the second resistor R21, a current of the branch where the second resistor R21 is provided may be limited. Therefore, by providing the first resistor R11 and the second resistor R21, the five-level rectifier circuit may be protected. It will be readily understood by those skilled in the art that, in other exemplary embodiments of the present disclosure, the auxiliary circuit described above may further include other components, which is not particularly limited in this exemplary embodiment.

Figure 4:
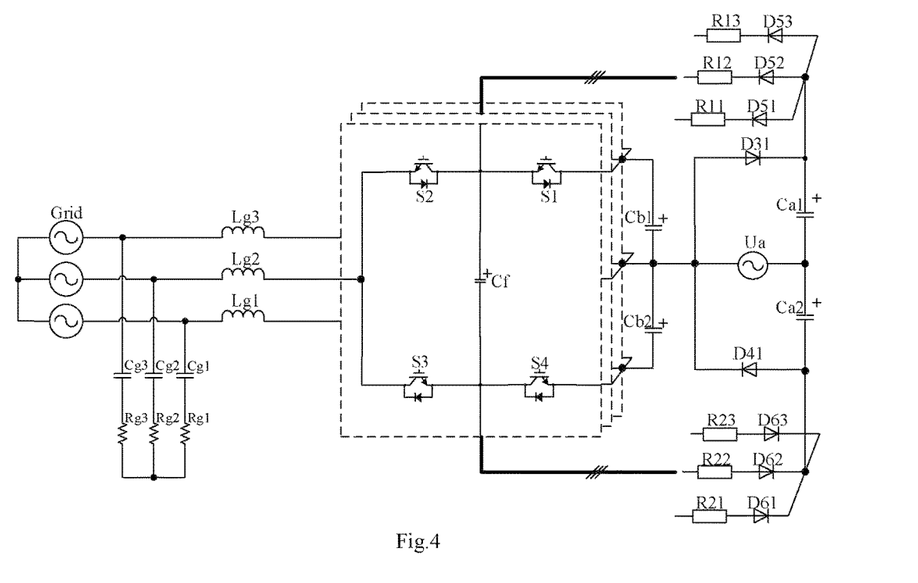
FIG. 4 is a circuit schematic diagram of a three-level rectifier circuit and a precharge device thereof in an exemplary embodiment of the present disclosure.

Continuing to refer to FIG. 3, the transistors S1~S4 in the multi-level converter circuit may be an IGBT (Insulated Gate Bipolar Transistor) switch. All of the first semiconductor component D11 and D12, the second semiconductor component D21 and D22, the third semiconductor component D31, the fourth semiconductor component D41, the fifth semiconductor component D51, and the sixth semiconductor component D61 may be diodes, such that the control is simpler. However, it should be noted that, the present exemplary embodiment is not limited to this, and the transistors in the multi-level converter circuit may also be a MOSFET (Metal Oxide Semiconductor Field Effect Transistor) switch or a BJT (Bipolar Junction Transistor) switch, and the like. The first to sixth semiconductor components may also be other semiconductor components or may include a plurality of diodes coupled in series. For example, in FIG. 3, the first semiconductor components include two series-coupled diodes D11 and D12, and the second semiconductor components also include two series-coupled diodes D21 and D22. In FIG. 4, the first semiconductor component and the second semiconductor element may be an anti-parallel diode in the IGBT switch S1 and IGBT switch S4, respectively, and so on.

In the present exemplary embodiment, when the multi-level converter circuit is used for processing multiphase AC input, the multi-level converter circuit may further include additional more groups of the first semiconductor component, the second semiconductor component and the flying capacitor. Correspondingly, the auxiliary circuit further includes more groups of the fifth semiconductor component D51 and the sixth semiconductor component D61, and the auxiliary circuit may further include more groups of the first resistors R11 and the second resistor R21 correspondingly. For example, the multi-level converter circuit may include N (N is an integer greater than 1) flying capacitors, N first semiconductor components and N second semiconductor components. In the embodiment, the $n^{th}$ of the first semiconductor components is electrically connected between a first end of the $n^{th}$ flying capacitor and a first end of the bus capacitor, and the $n^{th}$ of the second semiconductor components is electrically connected between a second end of the $n^{th}$ flying capacitor and a second end of the bus capacitor. The precharge device may include N fifth semiconductor components and N sixth semiconductor components. In the embodiment, the $n^{th}$ of the fifth semiconductor components is electrically connected between a first end of the $n^{th}$ flying capacitor and the first end of the first auxiliary capacitor, and the $n^{th}$ of the sixth semiconductor components is electrically connected between a second end of the $n^{th}$ flying capacitor and the second end of the second auxiliary capacitor. In another exemplary embodiment, the precharge device may further include N first resistors and N second resistors. In the embodiment, the $n^{th}$ of the fifth semiconductor components is electrically connected to the first end of the $n^{th}$ flying capacitor through the $n^{th}$ of the first resistors, and the $n^{th}$ of the sixth semiconductor components is electrically connected to the second end of the $n^{th}$ flying capacitor through the $n^{th}$ of the second resistors.

For example, continuing to refer to FIG. 3, when the five-level rectifier circuit is used for processing the three-phase AC input, the five-level rectifier circuit may further include another two groups of the first semiconductor components D11 and D12, another two groups of the second semiconductor components D21 and D22 and another two groups of the flying capacitor. Correspondingly, the auxiliary circuit further includes another two groups of the fifth semiconductor component D51 and another two groups of the sixth semiconductor component D61 (e.g., fifth semiconductor components D52, D53, and sixth semiconductor components D62, D63), and the auxiliary circuit may further include another two groups of the first resistor R11 and the second resistor R21 (e.g., first resistors R12, R13, and second resistors R22, R23) correspondingly.

Figure 5:
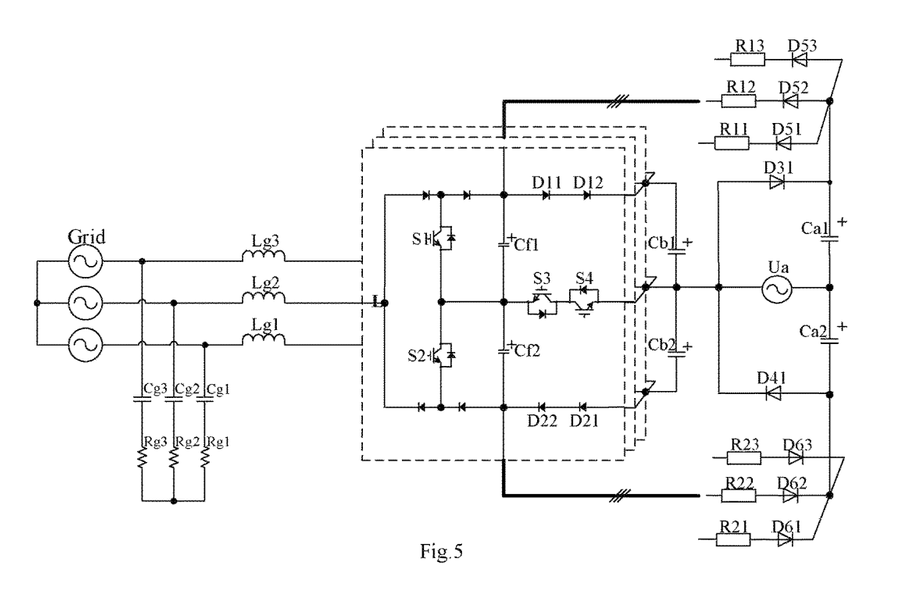
FIG. 5 is a circuit schematic diagram of another five-level rectifier circuit and a precharge device thereof in an exemplary embodiment of the present disclosure.

In addition, in the present exemplary embodiment, the multi-level converter circuit is exemplified by a multi-level rectifier circuit. However, in other exemplary embodiments of the present disclosure, the multi-level converter circuit may also be a multi-level inverter circuit. Meanwhile, the multi-level converter circuit is exemplified by a five-level converter circuit. However, in other exemplary embodiments of the present disclosure, it may also be other multi level converter circuits, such as a three-level converter circuit or a seven-level converter circuit. For example, FIG. 4 shows a precharge device in the present exemplary embodiment is applied in a three-level converter circuit. At the same time, the same multi-level converter circuit may also be implemented by adopting different topologies and different components. For example, FIG. 5 shows a case where a precharge device in the present embodiment is applied in a five-level converter circuit with another topology. In addition, the multi-level converter circuit may include other parts such as a filter module, in addition to the rectifier module. For example, the multi-level converter circuit as shown in FIGS. 3~5 may further include a filter module consisted of capacitors Cg1~Cg3, resistors Rg1~Rg3 and inductors Lg1~Lg2. It can be seen from above that, a specific structure of the flying capacitor type multi-level converter circuit is not particularly limited in the present exemplary embodiment.

Figure 6:
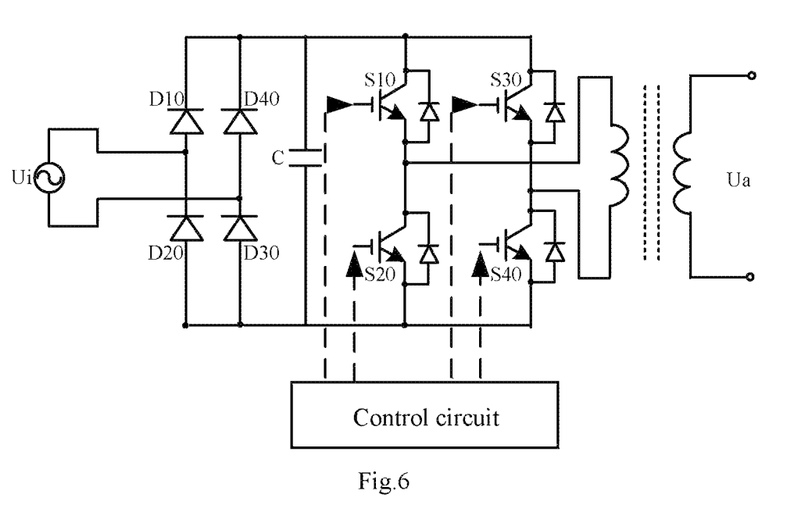
FIG. 6 is a circuit schematic diagram of an AC source in an exemplary embodiment of the present disclosure.
Figure 7:
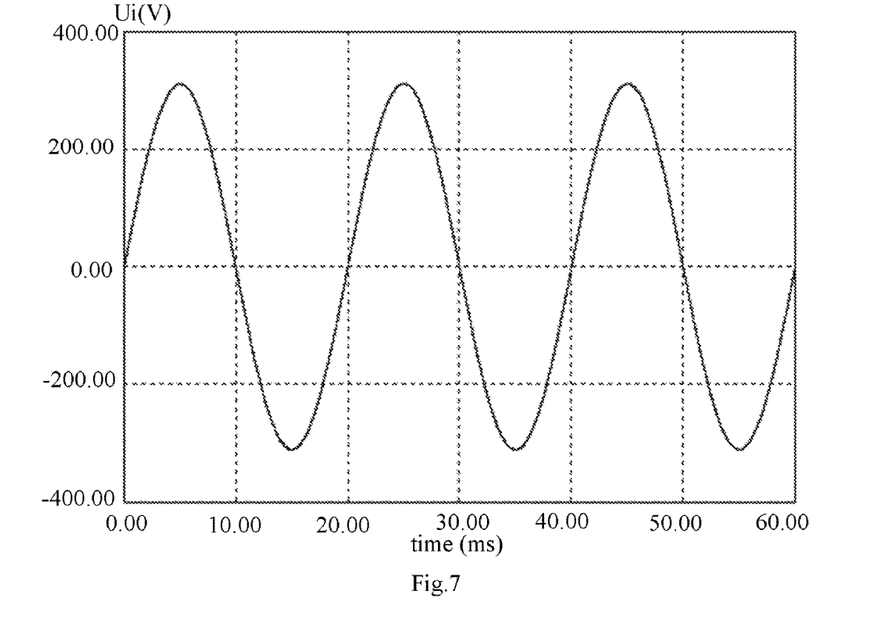
FIG. 7 is a power frequency input voltage waveform of an AC source in an exemplary embodiment of the present disclosure.
Figure 8:
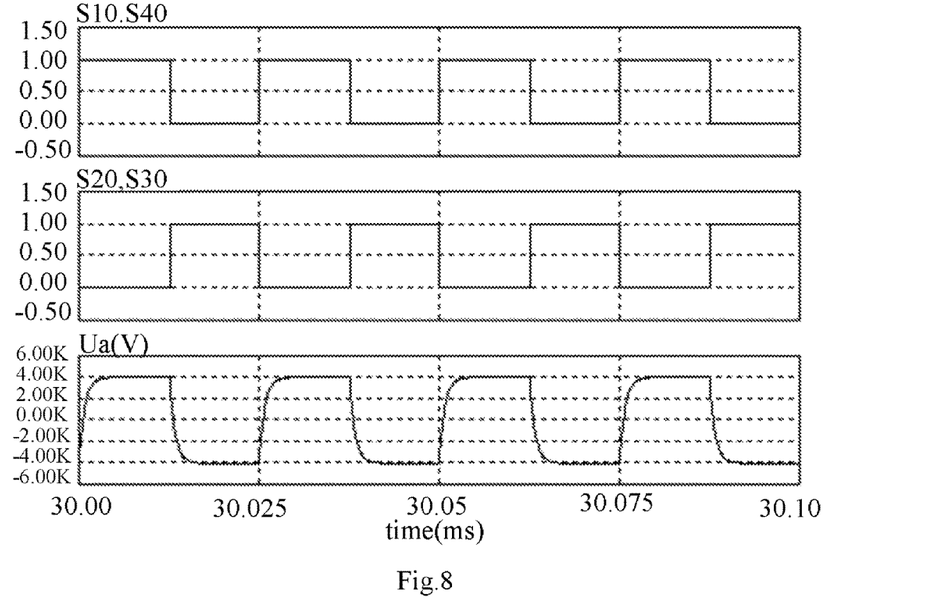
FIG. 8 is waveforms of a driving voltage and an output voltage of an AC source in an exemplary embodiment of the present disclosure.

Further, the present exemplary embodiment further provides an implementation of the AC source in the above-described auxiliary circuit. For example, the AC source may include a rectifier circuit, an inverter circuit and a boosting transformer, and it may further include other parts such as a control circuit. In the embodiment, the rectifier circuit may be used to rectify a first AC voltage to generate a DC voltage. The inverter circuit may be used to invert the DC voltage to generate a primary side AC voltage. The boosting transformer may be used to boost the primary side AC voltage to generate an output voltage of the AC source, and the output voltage of the AC source may be symmetrical AC half waves. FIG. 6 is a schematic diagram of a rectifier circuit, an inverter circuit and a boosting transformer in the AC source. In the embodiment, the first AC voltage may be a power grid voltage Ui. After the power grid voltage Ui is uncontrolled rectified through a rectifier circuit composed by diodes D10~D40 and filtered by a capacitor C, the DC voltage is obtained. The DC voltage is inverted into a high-frequency AC square wave (the primary side AC voltage) through a full bridge inverter circuit composed by transistors S10~S40. The high-frequency AC square wave is boosted by a high-voltage and high-frequency boosting transformer Tr and then supplied to the above auxiliary circuit. In the present exemplary embodiment, a frequency of the output voltage Ua of the AC source output from the high-voltage and high-frequency boosting transformer Tr is not less than 10 kHz, for example, may he 15 kHz, 20 kHz, and the like. In addition, a positive half-wave and a negative half-wave of the output voltage Ua are symmetric with each other. In FIG. 6, the full-bridge inverter circuit may adopt bipolar modulation, that is, the transistor S10 and the transistor S40 are turned on or turned off simultaneously, the transistor S20 and the transistor S30 are turned on or turned off simultaneously, and the duty cycle is about 50%. For example, FIG. 7 shows the waveform of the grid voltage Ui received by the rectifier circuit, and FIG. 8 shows waveforms of the drive signal output from the control circuit and the output voltage Ua of the high-voltage and high-frequency boosting transformer, where S10, S20, S30, S40 represent the drive signals output from the control circuit, a high level denotes a turn-on signal, a low level denotes a turn-off signal. It will be readily understood by those skilled in the art that, the inverter circuit in the present exemplary embodiment is not limited to the full-bridge inverter circuit of bipolar modulation, but it may also be other manners, such as a half bridge circuit or a push-pull circuit, and the like. The control method of the rectifier circuit is not limited to the uncontrolled rectification either, and it may also be other manners, such as fully controlled rectification and the like. The present disclosure is not limited thereto.

Figure 9:
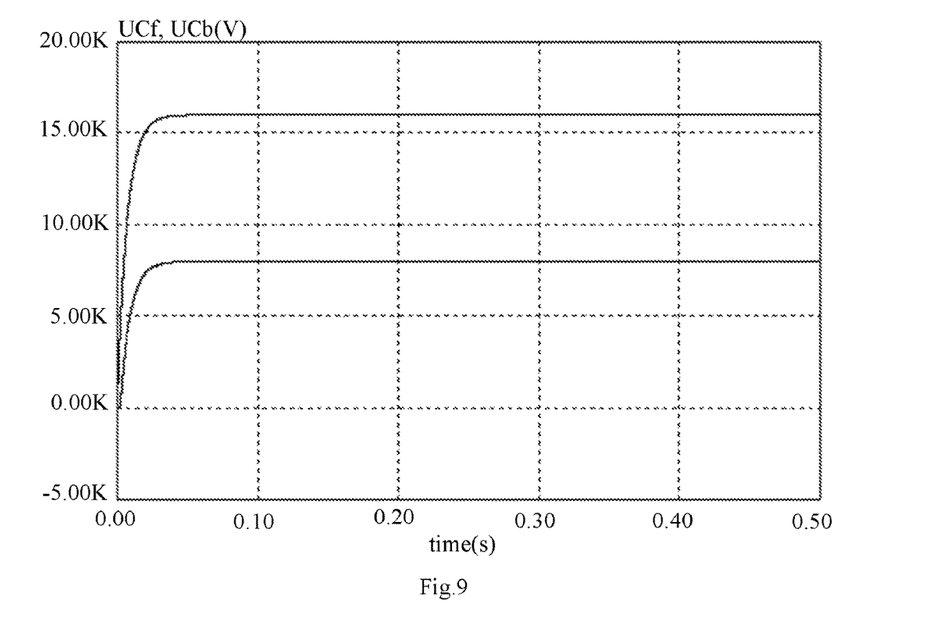
FIG. 9 is precharge voltage waveforms of a flying capacitor and a bus capacitor of a five-level rectifier circuit in an exemplary embodiment of the present disclosure.

In the following, an operation process of the precharge device in the present exemplary embodiment will be further described by taking the five-level rectifier circuit shown in FIG. 3 as an example. Assuming the output voltage Ua of the AC source is a high frequency AC square wave, when the output voltage Ua outputting to the first center point O1 is positive, the first auxiliary capacitor Ca1 is charged by the output voltage Ua through the third semiconductor component D31, the second bus capacitor Cb2 and the second auxiliary capacitor Cat are charged by the output voltage Ua through the second semiconductor components D21 and D22, the second resistor R21 and the sixth semiconductor component D61, the first flying capacitor Cf1 and the second flying capacitor Cf2 are charged by the output voltage Ua through the fifth semiconductor component D51, the first resistor R11, the second resistor R21 and the sixth semiconductor component D61, and the second auxiliary capacitor Ca2 is discharged; when the output voltage Ua outputting to the first center point O1 by the voltage source is negative, the second auxiliary capacitor Ca2 is charged by the output voltage Ua through the fourth semiconductor component D41, the first bus capacitor Cb1 and the first auxiliary capacitor Ca1 are charged by the output voltage Ua through the fifth semiconductor component D51, the first resistor R11 and the first semiconductor components D11 and D12, the first flying capacitor Cf1 and the second flying capacitor Cf2 are charged by the output voltage Ua through the fifth semiconductor component D51, the first resistor R11, the second resistor R21 and the sixth semiconductor component D61, and the first auxiliary capacitor Ca1 is discharged. Assuming an amplitude of the output voltage Ua is A, at a final steady state, a voltage of the first flying capacitor Cf1 is A, a voltage of the second flying capacitor Cf2 is A, a voltage of the first bus capacitor Cb1 is double A, a voltage of the second bus capacitor Cb1 is double A, a voltage of the first auxiliary capacitor Ca1 is A, and a voltage of the second auxiliary capacitor Ca2 is A. For example, FIG. 9 shows voltage waveforms of the flying capacitor and the bus capacitor precharged by the precharge device in the present exemplary embodiment; and it can be seen that it meets the precharge voltage requirement of the flying capacitor and the bus capacitor in the five-level frequency converter.

Further, the present exemplary embodiment further provides a frequency converter. The frequency converter includes a flying capacitor type multi-level converter circuit and any one of the above precharge devices. Since the above precharge device is used, the frequency converter at least has all advantages brought by the above precharge device, which will not be repeated in the present exemplary embodiment.

To sum up, in the precharge device provided by the present exemplary embodiment, by providing an auxiliary circuit which reuses a first semiconductor component and a second semiconductor component in the multi-level converter circuit, an AC source may charge the flying capacitor and the bus capacitor in the multi-level converter circuit through the auxiliary circuit, such that the current charging the flying capacitor and the bus capacitor may be limited at the moment of the power source being powered on, and in turn, elements in the multi-level converter circuit may be protected from being damaged due to an instantaneous short-circuit current of respective capacitors. In addition, since original devices in the multi-level converter circuit are reused, devices required by the precharge device can be reduced, which can in turn reduce the volume and cost of the precharge device. Furthermore, upper and lower buses are precharged dividually in the present exemplary embodiment, so that the insulation stress of the high-voltage and high-frequency boosting transformer can be greatly reduced, which facilitates the insulation design of the transformer.

The present disclosure has been described by the above related embodiments. However, the above embodiments are only examples for implementing the present disclosure. It should be noted that, the scope of the present disclosure is not limited to the disclosed embodiments. On the contrary, any modification and amendment without departing from the spirit and scope of the present disclosure will fall within the patent protection scope of the present disclosure.

What is claimed is:

1. A precharge device, applied in a flying capacitor type multi-level converter circuit, wherein the multi-level converter circuit comprises:
    a flying capacitor, a bus capacitor, a first semiconductor component and a second semiconductor component, wherein the first semiconductor component is electrically connected between a first end of the flying capacitor and a first end of the bus capacitor, and the second semiconductor component is electrically connected between a second end of the flying capacitor and a second end of the bus capacitor; and
    the precharge device comprises:
    an AC source; and
    an auxiliary circuit electrically connected with the AC source,
    wherein the auxiliary circuit reuses the first semiconductor component and the second semiconductor component, and the AC source charges the flying capacitor and the bus capacitor through the auxiliary circuit,
    wherein the bus capacitor comprises: a first bus capacitor and a second bus capacitor coupled in series, and the first bus capacitor and the second bus capacitor are electrically connected to a first center point; and
    the auxiliary circuit further comprises: a first auxiliary capacitor and a second auxiliary capacitor coupled in series, and the first auxiliary capacitor and the second auxiliary capacitor are electrically connected to a second center point,
    wherein an output of the AC source is electrically connected between the first center point and the second center point.

2. The precharge device according to claim 1, wherein the auxiliary circuit further comprises:
    a third semiconductor component electrically connected between the first center point and a first end of the first auxiliary capacitor;
    a fourth semiconductor component electrically connected between the first center point and a second end of the second auxiliary capacitor;
    a fifth semiconductor component electrically connected between a first end of the flying capacitor and the first end of the first auxiliary capacitor; and
    a sixth semiconductor component electrically connected between a second end of the flying capacitor and a second end of the second auxiliary capacitor,
    wherein the second end of the first auxiliary capacitor and the first end of a second auxiliary capacitor are electrically connected to the second center point.

3. The precharge device according to claim 2, wherein the auxiliary circuit further comprises:
    a first resistor coupled in series with the fifth semiconductor component, the fifth semiconductor component being electrically connected to the first end of the flying capacitor through the first resistor; and
    a second resistor coupled in series with the sixth semiconductor component, the sixth semiconductor component being electrically connected to the second end of the flying capacitor through the second resistor.

4. The precharge device according to claim 2, wherein all of the third semiconductor component, the fourth semiconductor component, the fifth semiconductor component and the sixth semiconductor component are diodes.

5. The precharge device according to claim 1, wherein the AC source further comprises:
    a rectifier circuit rectifying a first AC voltage to generate a DC voltage;
    an inverter circuit inverting the DC voltage to generate a primary side AC voltage; and
    a boosting transformer boosting the primary side AC voltage to generate an output voltage of the AC source.

6. The precharge device according to claim 5, wherein the first AC voltage is a power grid voltage.

7. The precharge device according to claim 1, wherein a frequency of an output voltage of the AC source is not less than 10 kHz.

8. The precharge device according to claim 1, wherein a positive half-wave and a negative half-wave of an output voltage of the AC source are symmetric with each other.

9. The precharge device according to claim 1, wherein the multi-level converter circuit is a multi-level rectifier circuit or a multi-level inverter circuit.

10. The precharge device according to claim 1, wherein the multi-level converter circuit is a three-level converter circuit or a five-level converter circuit.

11. The precharge device according to claim 1, wherein the first semiconductor component and the second semiconductor component are diodes.

12. The precharge device according to claim 1, wherein the first semiconductor component and the second semiconductor component are anti-parallel diodes in IGBT switches.

13. A precharge device, applied in a flying capacitor type multi-level converter circuit, wherein the multi-level converter circuit comprises:
   a bus capacitor containing a first bus capacitor and a second bus capacitor coupled in series, the first bus capacitor and the second bus capacitor being electrically connected to a first center point;
   N flying capacitors, N being an integer greater than 1;
   N first semiconductor components, wherein the $n^{th}$ of the first semiconductor components is electrically connected between a first end of the $n^{th}$ flying capacitor and a first end of the bus capacitor; and
   N second semiconductor components, wherein the $n^{th}$ of the second semiconductor components is electrically connected between a second end of the $n^{th}$ flying capacitor and a second end of the bus capacitor;
   the precharge device comprises:
   an AC source electrically connected with an auxiliary circuit and charging the flying capacitor and the bus capacitor through the auxiliary circuit;
   the auxiliary circuit reuses the first semiconductor component and the second semiconductor component and the auxiliary circuit further comprises:
   a first auxiliary capacitor;
   a second auxiliary capacitor having a first end electrically connected to a second end of the first auxiliary capacitor;
   a third semiconductor component electrically connected between the first center point and a first end of the first auxiliary capacitor;
   a fourth semiconductor component electrically connected between the first center point and a second end of the second auxiliary capacitor;
   N fifth semiconductor components, wherein the $n^{th}$ of the fifth semiconductor components is electrically connected between a first end of the $n^{th}$ flying capacitor and the first end of the first auxiliary capacitor; and
   N sixth semiconductor components, wherein the $n^{th}$ of the sixth semiconductor components is electrically connected between a second end of the $n^{th}$ flying capacitor and the second end of the second auxiliary capacitor.

14. The precharge device according to claim 13, further comprising:
   N first resistors, wherein the $n^{th}$ of the fifth semiconductor components is electrically connected to the first end of the $n^{th}$ flying capacitor through the $n^{th}$ of the first resistors; and
   N second resistors, wherein the $n^{th}$ of the sixth semiconductor components is electrically connected to the second end of the $n^{th}$ flying capacitor through the $n^{th}$ of the second resistors.

15. A frequency converter, comprising a flying capacitor type multi-level converter circuit and a precharge device, wherein the multi-level converter circuit comprises:
   a flying capacitor, a bus capacitor, a first semiconductor component and a second semiconductor component, wherein the first semiconductor component is electrically connected between a first end of the flying capacitor and a first end of the bus capacitor, and the second semiconductor component is electrically connected between a second end of the flying capacitor and a second end of the bus capacitor; and
   the precharge device comprises:
   an AC source; and
   an auxiliary circuit electrically connected with the AC source,
   wherein the auxiliary circuit reuses the first semiconductor component and the second semiconductor component, and the AC source charges the flying capacitor and the bus capacitor through the auxiliary circuit,
   wherein the bus capacitor comprises: a first bus capacitor and a second bus capacitor coupled in series, and the first bus capacitor and the second bus capacitor are electrically connected to a first center point; and
   the auxiliary circuit further comprises: a first auxiliary capacitor and a second auxiliary capacitor coupled in series, and the first auxiliary capacitor and the second auxiliary capacitor are electrically connected to a second center point,
   wherein an output of the AC source is electrically connected between the first center point and the second center point.

16. The frequency converter according to claim 15, wherein the auxiliary circuit further comprises:
   a third semiconductor component electrically connected between the first center point and a first end of the first auxiliary capacitor;
   a fourth semiconductor component electrically connected between the first center point and a second end of the second auxiliary capacitor;
   a fifth semiconductor component electrically connected between a first end of the flying capacitor and the first end of the first auxiliary capacitor; and
   a sixth semiconductor component electrically connected between a second end of the flying capacitor and a second end of the second auxiliary capacitor,
   wherein the second end of the first auxiliary capacitor and the first end of a second auxiliary capacitor are electrically connected to the second center point.

* * * * *